(12) United States Patent
McPherson

(10) Patent No.: US 6,944,167 B1
(45) Date of Patent: Sep. 13, 2005

(54) METHOD AND APPARATUS FOR DYNAMIC ALLOCATION OF PRIVATE ADDRESS SPACE BASED UPON DOMAIN NAME SERVICE QUERIES

(75) Inventor: John McPherson, Leavenworth, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 336 days.

(21) Appl. No.: 09/695,109

(22) Filed: Oct. 24, 2000

(51) Int. Cl.[7] .............................................. H04L 12/56
(52) U.S. Cl. ...................................... 370/401; 370/475
(58) Field of Search ............................... 370/401, 400, 370/471, 395.2, 395.3, 395.31, 475, 352–356, 370/389, 466; 709/245, 227, 249, 250, 225, 709/219, 223, 224, 220

(56) References Cited

U.S. PATENT DOCUMENTS 6,058,431 A  *  5/2000  Srisuresh et al. ........... 709/245
6,128,664 A     10/2000  Yanagidate et al.
6,591,306 B1 *  7/2003  Redlich ....................... 709/245

OTHER PUBLICATIONS

Tsuchiya, Paul F. and Eng, Tony, "Extending the IP Internet Through Address Reuse," Computer Communication Review, pp. 16-33.

Y. Rekhter, "Address Allocation for Private Internets" Feb. 1996 pp. 1-9, Best Current Practice.
K. Egevang, "The IP Network Address Translator (NAT)," May 1994, pp. 1-10, Network Address Translator.

* cited by examiner

Primary Examiner—Wellington Chin
Assistant Examiner—Brenda Pham

(57) ABSTRACT

According to the invention, a method and apparatus are disclosed for dynamically assigning a public network address for a private network host in response to a request generated external to the private network. A requesting host desiring access to a host with the private network queries a domain name server for the public network address of the private network host. Then, the domain name sever queries a network address translator of the private network, and receives a reply indicating a dynamically allocated public network address for the specified private network host. The requesting host can then use this returned public network address for communicating with the private network host. In this manner, a set of public addresses can be shared, with a public network address being dynamically allocated to a private network host in response to a request for access by a host external to the private network. Moreover, a public network address is assigned to a private network host for a limited period of time. This time period can be specified as a period of network inactivity related to the public network address, or a specified time duration (e.g., for one hour, from 3:00 PM to 5:00 PM). The aging of these assigned public addresses is processed by the domain name server itself, or by the network address translator which sends a message to the domain name server when an assigned public address is no longer valid for a particular private network host.

18 Claims, 5 Drawing Sheets

200 ⟶

| ADDRESS DATA STRUCTURE | | | | |
|---|---|---|---|---|
| HOST NAME | PRIVATE IP ADDRESS | PUBLIC IP ADDRESS | LEASE TIME | |
| dns.private.net | 10.0.1.5 | 144.230.1.5 | PERMANENT | ←210 |
| host_a.private.net | 10.0.1.7 | 144.230.1.10 | 1 HOUR | ←220 |
| host_b.private.net | 10.0.1.8 | | | ←230 |
| 201 | 202 | 203 | 204 | |

| ADDRESS DATA STRUCTURE | | | | |
|---|---|---|---|---|
| HOST NAME | PRIVATE IP ADDRESS | PUBLIC IP ADDRESS | LEASE TIME | |
| dns.private.net | 10.0.1.5 | 144.230.1.5 | PERMANENT | |
| host_a.private.net | 10.0.1.7 | 144.230.1.10 | 1 HOUR | |
| host_b.private.net | 10.0.1.8 | 144.230.1.13 | 15 MINUTES | ←260 |

*FIG. 2B*

METHOD AND APPARATUS FOR DYNAMIC ALLOCATION OF PRIVATE ADDRESS SPACE BASED UPON DOMAIN NAME SERVICE QUERIES

BACKGROUND OF THE INVENTION

1. Field of the Invention

This invention relates to data communication, network address translators, and domain name servers; and more particularly, to the dynamic allocation of a shared network address by a network address translator to a private network device in response to a domain name server query.

2. Description of the Prior Art

The internet and the World Wide Web are rapidly expanding, with the number of new devices being connected at a phenomenal rate. A direct result of this expansion is a shortage of Internet Protocol (IP) addresses. Internet Protocol is the fundamental protocol used to route traffic across the Internet. It is typical to assign a globally unique address to each host attached to the Internet that use TCP/IP. However, in order to extend the life of the current IP addressing scheme (i.e., IPv4), address registries are requiring more justification before an organization can acquire additional IP address. Thus, an organization may not have enough assigned globally unique IP addresses to dedicate one to each host computer desiring global connectivity.

Network address translation (NAT) was developed as a way of addressing IP address depletion and scaling in routing problems. NAT allows the use of IP network addresses within a private enterprise network which are unique within the private enterprise network, but which are ambiguous outside the private enterprise network (e.g., across the Internet). This allows the same IP network number to be used in other local or private domains (i.e., private enterprise networks); and thus, helps to lessen the impact of the IP depletion problem.

For example, private enterprise networks can number their hosts according to the methodology proposed in "Address Allocation for Private Internets", RFC 1918. A NAT router is placed at the border of the private enterprise network and is used as an interface to the Internet or other external network. The NAT router allows a host within a private enterprise to communicate with another host on the Internet (i.e., outside the private enterprise network) by translating the IP address of the private enterprise host to and from a globally unique IP address. To allow a host within the private network to be accessed by a host external to the private network, the NAT address translation must be known prior, and be statically defined. The NAT router can then use this static address translation to translate the predetermined globally unique IP address to the private network address of the host. This NAT approach works well when the number of hosts desiring global connectivity is equal to or less than the number of globally unique IP numbers assigned to the NAT router. Network address translation and it use is further described in "The IP Network Address Translator (NAT)", RFC 1631.

When the number of hosts desiring global Internet connectivity exceed the number of globally unique IP addresses assigned to a NAT router, a NAT router implementation allowing dynamic address translation is required. Dynamic address translation allows a single globally unique IP address to be time-shared by a plurality of private network hosts. In this configuration, a NAT router assigns a private network host one of a pool of unique IP addresses to use for a finite amount of time. After a time-out period, typically based on a predetermined time period of inactivity, the globally unique IP address is relinquished, returned to the pool of globally unique IP addresses, and made available for other private enterprise hosts to use. However, current dynamic address translation NAT implementation provide for only a one-way assignment of a globally unique IP address to a private network host, which is based on a request from a host within the NAT's private enterprise network. Generally, a host external to the private network cannot reach a desired host within the private enterprise network where the NAT router uses dynamic IP address assignment. Such externally requested connectivity is only possible in the limited case where a NAT dynamically assigned IP address still resides for the desired private network host from a previous request initiated by a private network host. Once this address translation entry is removed from the NAT router's translation tables, externally-initiated connectivity is not possible. Moreover, a reason for using dynamic provisioning of globally unique IP addresses is so a plurality of private network hosts can share a limited number of globally unique IP addresses, and thus, a private network host is typically not assigned the same globally unique IP address each time.

SUMMARY OF THE INVENTION

According to the invention, a method and apparatus are disclosed for dynamically assigning a public network address for a private network host in response to a request generated external to the private network. A requesting host desiring access to a host within the private network queries a domain name server for the public network address of the private network host. Then, the domain name server queries a network address translator for the private network, and receives a reply indicating a dynamically allocated public network address for the specified private network host. The requesting host can then use this returned public network address for communicating with the private network host. In this manner, a set of public addresses can be shared, with a public network address being dynamically allocated to a private network host in response to a request for access by a host external to the private network.

In one embodiment of the present invention, a domain name server receives a request for the public address of a private network host, using a public Internet Protocol (IP) address. The domain name server then determines if a valid public address for the private network host exists in an address data structure maintained by the domain name server. If a valid public address is found, the domain name server returns it to the requesting host. If a valid public address is not found, then the domain name server requests a public address from a network address translator identified with the private network. The network address translator then determines whether a public network address is currently assigned to the private network host. If not, and one is available from a pool of public network addresses available to the network address translator for the private network, then the network address translator allocates a public network address for the private network host. The network address translator then sends the domain name server the public network address or an indication that such address or the host was unavailable. An appropriate public network address might not be assigned for many reasons, including all public numbers are currently used or reserved; the private network host is not running; or security considerations preclude public access to the private network host.

Furthermore, a public network address is assigned to a private network host for a limited period of time in accordance with the present invention. This time period can be specified as a period of network inactivity related to the public network address, or a specified time duration (e.g., for one hour, from 3:00 PM to 5:00 PM). The aging of these assigned public addresses is processed by the domain name server itself, or by the network address translator which sends a message to the domain name server when an assigned public address is no longer valid for a particular private network host. These messages are preferably sent using Simple Network Management Protocol (SNMP); although the present invention provides for the use of any appropriate communications mechanism.

Embodiments of the present invention include computer-readable medium containing computer-executable instructions for performing a method of the present invention, and a computer system performing a method of the present invention.

An embodiment of a method of the present invention provides for operating a computer system to respond to a domain name service query for a public address of a private network host. This method preferably comprises the steps of: receiving the domain name service query from a requesting host for the public address of the private network host; sending a request to a network address translator for the public address of the private network host; receiving a reply from the network address translator containing the public address of the private network host; and sending the public address of the private network host to the requesting host. Preferably, the public address is an Internet Protocol (IP) address. Preferably, the request to the network address translator is in a Simple Network Management Protocol format.

Preferably, the method further comprises the step of updating an address data structure in response to receiving the public address of the private network host. Preferably, the reply from the network address translator includes a time period in which the public address of the private network host is valid; and the method further comprises the step of updating the address data suture in response to the public address of the private network host not being valid. Preferably, the time period specifies a time duration of network inactivity for the public address. Preferably, the method further comprises the steps of: receiving a timeout message from the network address translator for the public address of the private network host; and updating the address data structure in response to receiving the time-out message.

An embodiment of another method of the present invention provides for operating a computer system to respond to a request for a public address of a private network host. This method preferably comprises the steps of: receiving the request for the public address of the private network host from a querying system; dynamically assigning the public address for the private network host; and sending the assigned public address for the private network host to the querying system. Preferably, the public address is an Internet Protocol (IP) address. Preferably, the computer system comprises a network address translator. Preferably, the method further includes sending a time period in which the public address of the private network host is valid. Preferably, the method further comprises the step of sending a time-out message to the querying system for the assigned public address for the private network host. Preferably, the public address request is received and the public address is sent in a Simple Network Management Protocol format.

BRIEF DESCRIPTION OF THE DRAWINGS

The appended claims set forth the features of the present invention with particularity. The invention, together with its advantages, may be best understood from the following detailed description taken in conjunction with the accompanying drawings of which:

FIGS. 2A–B illustrate an address data structure representing address data used in practicing the present invention;

DETAILED DESCRIPTION OF THE PREFERRED EMBODIMENT

Figure 1:
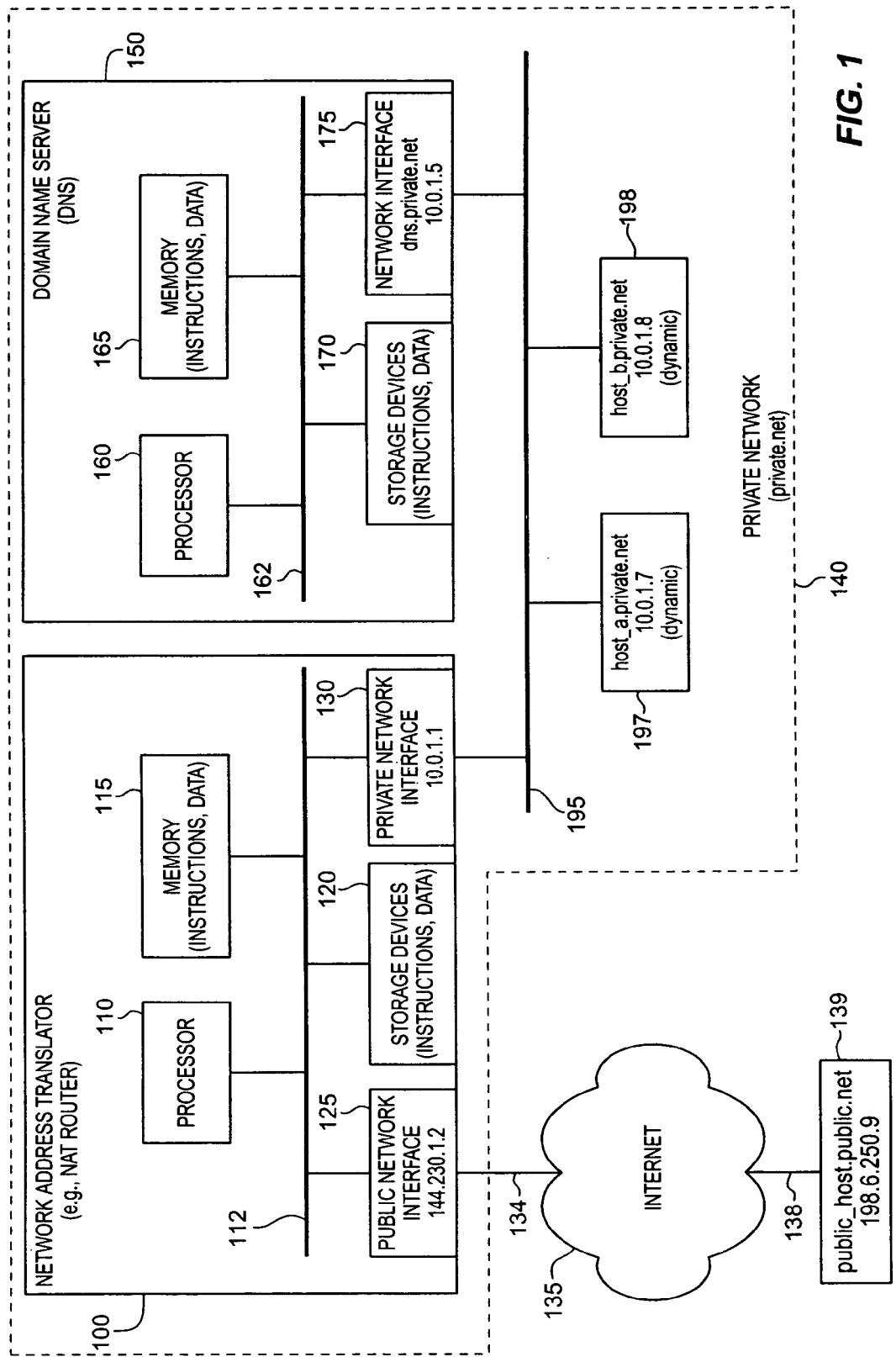
FIG. 1 is a block diagram of an exemplary network environment in which the present invention may be practiced.

FIG. 1 and its discussion herein are intended to provide a description of a general computing environment in which the present invention can be practiced. The present invention is not limited to a single computing environment. Moreover, the architecture and functionality of the present invention as taught herein and would be understood by one skilled in the art is extensible to an unlimited number of computing environments and embodiments in keeping with the scope and spirit of the present invention.

Turning first to FIG. 1, an exemplary operating environment is illustrated in which the present invention may be practiced. The present invention provides for dynamic assignment of a public network address to a private network host based on a request from a host external to the private network (e.g., located in the public network). The network diagram of FIG. 1 illustrates a private network 140 having an Internet domain name of "private.net", and a public network portion comprised of Internet 135 and public host 139 connect to Internet 135 via facility 138. Private network 140 will first be described, and then the operation of an embodiment of the present invention with reference to the data structures, message sequence chart, and flow diagrams illustrated in FIGS. 2–5.

Private network 140 comprises a network address translator 100 interconnected via a local area network (LAN) 195 with a domain name server (DNS) 150 and private network hosts 197–198. For illustrative purposes, domain name server 150 is located within private network 140. In other embodiments in keeping with the scope and spirit of the present invention, domain name server 150 is located external to private network 140.

Network address translator 100 typically comprises a standard computer platform or a specialized computer platform optimized for performing its address translation function. Network address translator 100 comprises a processor 110, memory 115, storage devices 120, a public network interface 125, and a private network interface 130, which are electrically coupled via bus 112. Public network interface 125 is connected to the public network (e.g., Internet 135) over facility 134. Memory 115 is one type of computer-readable medium, and typically comprises random access memory (RAM), read only memory (ROM), integrated circuits, and/or other memory components. Memory 115 typically stores computer-executable instructions to be executed by processor 110 and/or data which is manipulated by processor 110. Storage devices 120 are another type of computer-readable medium, and typically comprise disk drives, diskettes, networked services, tape drives, and other storage devices. Storage devices 120 typically store computer-executable instructions to be executed by processor 110 and/or data which is manipulated by processor 110.

Domain name server 150 typically comprises a standard computer platform having a network interface 175. Domain name server 150 comprises a processor 160, memory 165, storage devices 170, and a network interface 175, which are electrically coupled via bus 162. Memory 165 is one type of computer-readable medium, and typically comprises random access memory (RAM), read only memory (ROM), integrated circuits, and/or other memory components. Memory 165 typically stores computer-executable instructions to be executed by processor 110 and/or data which is manipulated by processor 160. Storage devices 170 are another type of computer-readable medium, and typically comprise disk drives, diskettes, networked services, tape drives, and other storage devices. Storage devices 170 typically store computer-executable instructions to be executed by processor 160 and/or data which is manipulated by processor 160.

For illustration purposes, certain elements of FIG. 1 have a domain name and/or an IP address. In this exemplary configuration, requesting public host 139 has domain name "public_host.public.net" with IP address 198.6.250.9; public network interface 125 of network address translator 100 has IP address 144.230.1.2; private network interface of network address translator 100 has IP address 10.0.1.1; network interface 175 of domain name server 150 has domain name "dns.private.net", a private network IP address of 10.0.1.5, and a public IP address of 144.230.1.5; private network host 197 has domain name "host_a.private.net" and IP address of 10.0.1.7; and private network host 198 has domain name "host_b.private.net" and IP address of 10.0.1.8. The public IP address for network interface 175 of domain name server 150 is permanently defined in an address data structure of network address translator 100 to allow domain name server 150 to receive DNS requests from hosts outside private network 140. As would be understood by one skilled in the art, the exemplary domain names and IP addresses presented and discussed with reference to FIGS. 1–5 are used to help better describe the present invention, with the present invention not being so limited to this illustrated configuration.

Turning now to FIG. 2A, illustrated is an address data structure 200 which is maintained by domain name server 150 and also by network address translator 100. Address data structure 200 maintains entries comprising one or more of the following populated fields: hostname 201, private IP address 202, public IP address 203 and lease time 204. Lease time 204 indicates a time period in which the public IP address 203 for the private network host (having hostname 201 and private IP address 202) is valid.

Figure 2C:
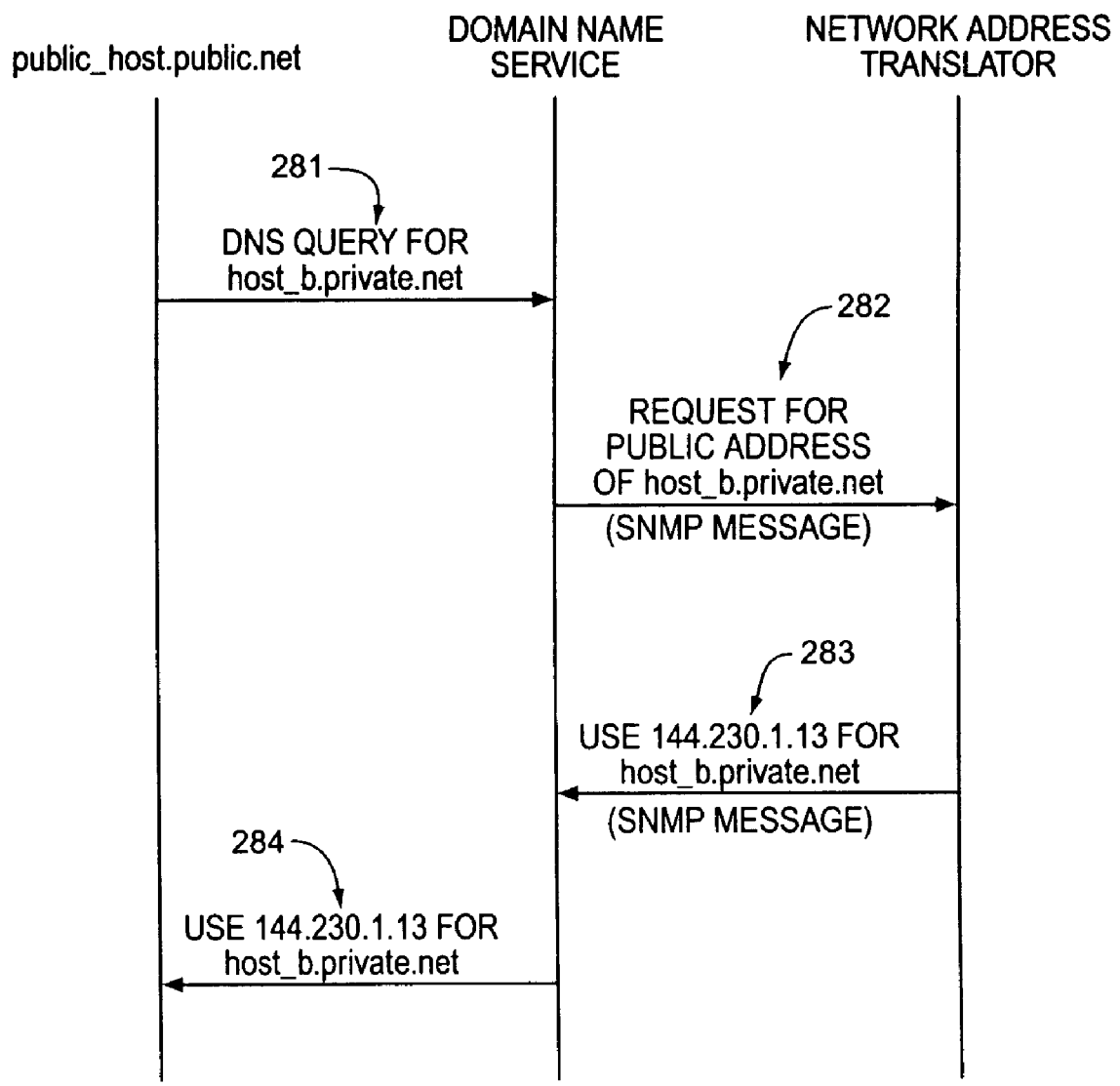
FIG. 2C is a message sequence chart illustrating the flow of messages for requesting, dynamically assigning, and publicizing a public network address for a private network host in accordance with the present invention.

Entries 210–230 correspond to the network configuration illustrated in FIG. 1. Entry 210 for "dns.private.net" with private IP address 10.0.1.5 illustrates that its public IP address of 144.230.1.5 has been permanently assigned to allow domain name server 150 to receive DNS requests from hosts outside private network 140. Entry 220 for "host_a.private.net" with private IP address 10.0.1.7 illustrates that its public IP address of 144.230.1.10 has been dynamically assigned for a lease time of 1 hour. Entry 230 for "host_b.private.net" with private IP address 10.0.1.8 has no public IP address assigned at the present time. FIG. 2C, in conjunction with FIG. 1, illustrates a method, in accordance with the present invention, for dynamically allocating a public IP address for host_b.private.net (entry 230).

Turning now to FIG. 2C, illustrated is a message sequence chart illustrating messages passed between requesting host "public_host.public.net" 139 (FIG. 1), domain name server 150 (FIG. 1), and network address translator 100 (FIG. 1). Beginning with message 281, requesting host 139 sends a DNS query to domain name server 150 requesting the public address of the private network host "host_b.private.net" 198 (FIG. 1). Domain name server 150 then checks its address data structure 200 (FIG. 2) and determines that it currently does not know the requested public address for private network host "host_b.private.net" 198. Domain name server 150 then sends message 282 to network address translator 100 requesting the public address for private network host "host_b.private.net" 198. Network address translator 100 receives this request, then dynamically assigns an available public network address for the private network host from its pool of available public addresses. In this example, public address 144.230.1.13 is assigned, along with a lease time period of 15 minutes for the private host to use the dynamically assigned public address. Network address translator 100 sends, in message 283, this assigned public address for the private network host (and optionally the lease time period) to querying system, domain name server 150 in this example. Messages sent between domain name server 150 and network address translator 100 are preferably sent in a Simple Network Management Protocol (SNMP) format. Domain name server 150 receives this reply, updates its address data structure 250 (FIG. 2B), and sends, in message 284, the dynamically assigned public address of the private network host (and optionally the lease time period) to the requesting host.

Turning now to FIG. 2B, illustrated is the updated address data structure 250, which is address data structure 200 of FIG. 2A updated in accordance with the message sequence chart of FIG. 2C. Notice that elements 260 have been updated with the dynamically assigned public IP address (144.230.1.13) and lease time (15 minutes) for private network host host_b.private.net.

Figure 3:
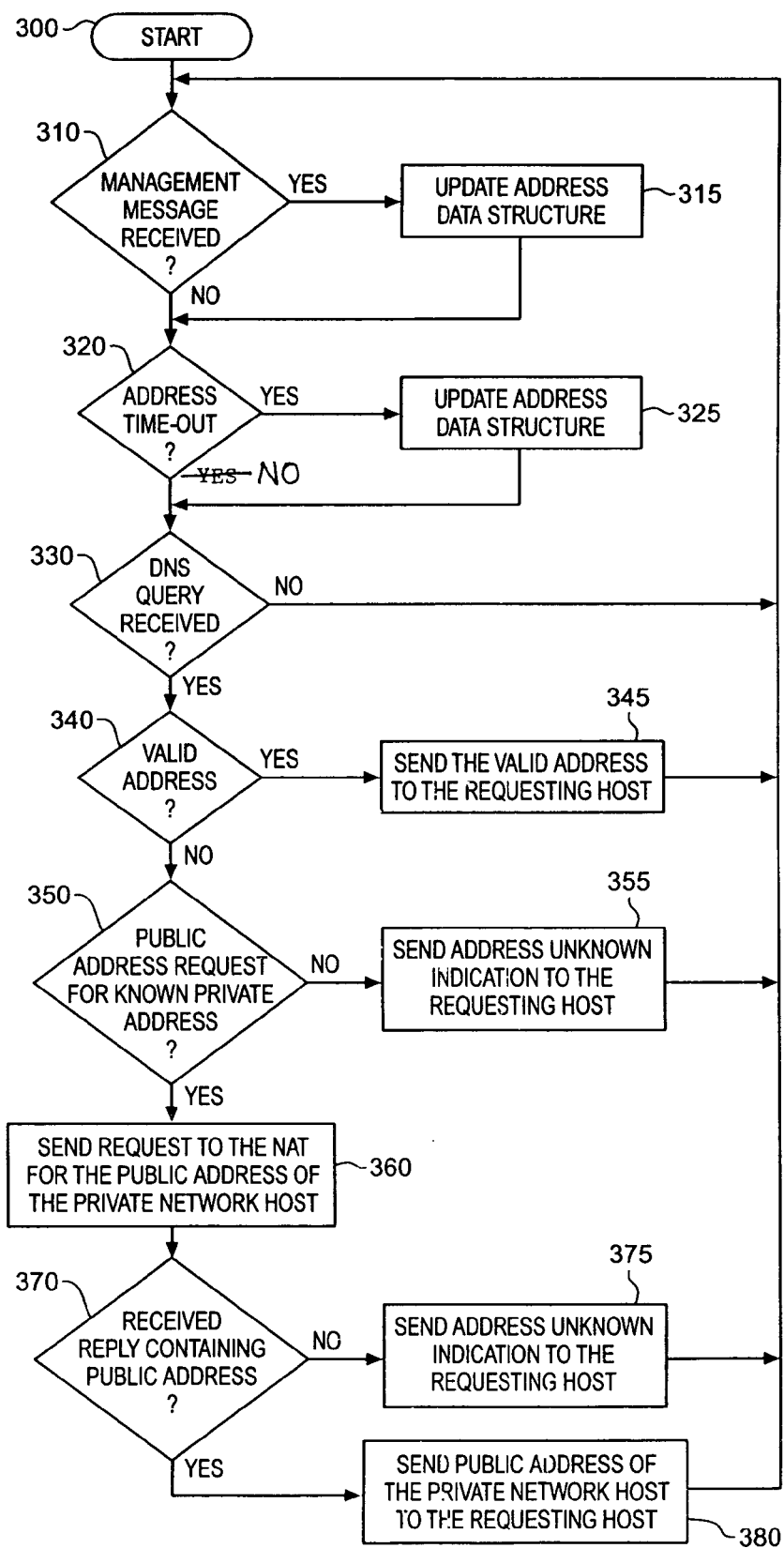
FIG. 3 is a flow diagram illustrating the steps performed by the domain name server in an embodiment of the present invention.

The processing performed in accordance with the present invention for the domain name server 150 (FIG. 1) is further illustrated by the flow diagram of FIG. 3, which will now be described. Processing begins with step 300, and proceeds to step 310. If domain name server 150 determines that it has received a management message (e.g., an indication that a public address is no longer valid, or the publishing of a new public network address), then the domain name server 150 updates its address data structure accordingly in step 315.

Next, in step 320, if domain name server 150 determines that a public address for a private network host has timed-out or expired, then domain name server 150 updates its address data structure accordingly in step 325 to remove or make inactive any timed-out addresses.

Next, if domain name server 150 receives an DNS query as determined in step 330, then if the DNS query is for a host having a valid address in the address data structure as determined in step 340, then the address is retrieved from the address data structure and sent to the requesting host in step 345. This address could either be a valid public address for a private network host or a valid private network address depending on the request host. Otherwise, if the request is for a public address for a known private address as determined in step 350, then a request is sent in step 360 to the network address translator 100 for the public address of the private network host specified in the original DNS query, if a responsive message is received as determined in step 370, domain name server 150, in step 380, relays the public address of the private network host to the request host. Otherwise, a message is sent to the requesting host that the address is unknown for the host specified in the DNS query (steps 355, 375). Processing then returns to the top of the loop (step 310) to repeat the processing of steps illustrated in FIG. 3.

Figure 4:
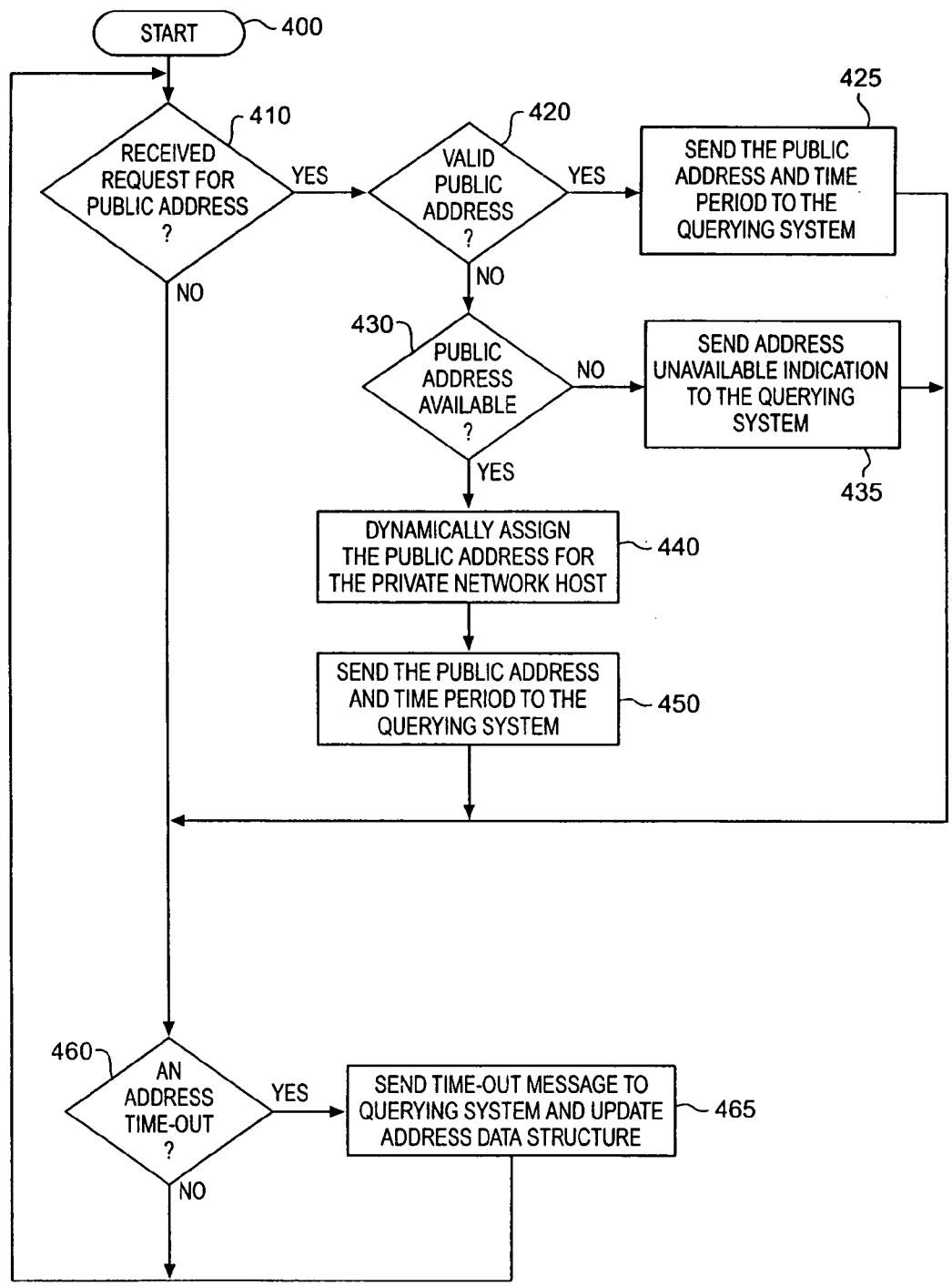
FIG. 4 is a flow diagram illustrating the steps performed by the domain name server in an embodiment of the present invention.

Turning now to FIG. 4, illustrated are the steps performed by an embodiment of the network address translator 100 (FIG. 1) in accordance with the present invention. Processing begins with step 400, and proceeds to step 410, where the network address translator 100 determines whether a request has been received for a public address for a private network host. If such a request has been received, then network address translator 100 determines, in step 420, whether a valid public address is assigned for the private network host specified in the received request. If a valid address has already been assigned, the network address translator 100, in step 425, sends the public address (and optionally an indication of a time period for which the public network address is valid) to the querying system.

Otherwise, the network address translator attempts to assign a public address for the specified private network host. If, at step 430, network address translator 100 determines that no public addresses are currently available, then a message indicating such is returned in step 435. Otherwise, network address translator 100 dynamically assigns a public address for the private network host (and updates its address data structure) in step 440. Then, in step 450, network address translator 100 sends the dynamically assigned public address (and optionally an indication of a time period for which the public network address is valid) to the querying system.

Next, network address translator 100 determines, in step 460, if a dynamically assigned address has timed-out. If so, then, in step 465, a message is sent to domain name server 150 (and any other querying system for that address) that the address is no longer valid, and network address translator 100 updates its address data structure.

In view of the many possible embodiments to which the principles of our invention may be applied, it will be appreciated that the embodiment described herein with respect to the drawing figures is only illustrative and should not be taken as limiting the scope of the invention. To the contrary, the invention as described herein contemplates all such embodiments as may come within the scope of the following claims and equivalents thereof.

I claim:

1. A communication network, comprising:
    a domain name server configured to maintain a first address data structure having a host name field, a private address field, a public address field, and a lease time field, determine if any public addresses in the public address field of the first address data structure have timed-out and update the first address data structure responsive to determining that at least one of the public addresses in the public address field of the first address data structure has timed-out, receive a query from a requesting host for a public address of a private network host, determine if a public address for the private network host has been assigned as indicated by the first address data structure, and transmit a request for the public address of the private network host if the public address of the private network host has not been assigned; and
    a network address translator configured to maintain a second address data structure having a host name field, a private address field, a public address field, and a lease time field, receive the request for the public address of the private network host, dynamically assign the public address to the private network host and a time period for the assignment of the public address to the private network host, update the second address data structure based on the public address and time period assignment, transmit a response indicating the public address of the private network host and the time period, determine if any public addresses in the public address field of the second address data structure have timed-out and if at least one of the public addresses in the public address field of the second address data structure has timed-out, then update the second address data structure and transmit a message to the domain name server that the public address of the private network host is no longer valid;
    the domain name server further configured to receive the response indicating the public address of the private network host and the time period, update the first address data structure based on the public address and time period assignment, and transmit the public address of the private network host to the requesting host.

2. The communication network of claim 1 wherein the public address comprises an Internet Protocol (IP) address.

3. The communication network of claim 1 wherein the tine period indicates a time period in which the public address of the private network host is valid.

4. The communication network of claim 1 wherein the time period specifies a time duration of network inactivity for the public address.

5. The communication network of claim 1 wherein the request to the network address translator is in a Simple Network Management Protocol format.

6. The communication network of claim 1 wherein the domain name server is configured to receive and process management messages to update the first address data structure.

7. The communication network of claim 1 wherein the network address translator is configured to:
    determine if a public address has already been assigned to the private network address before dynamically assigning the public address to the private network host; and
    transmit the response indicating the public address already assigned to the private network host.

8. The communication network of claim 7 wherein the network address translator is configured to transmit an indication of a time period remaining for which the public address is valid.

9. The communication network of claim 1 wherein the network address translator is configured to determine if a public address is available before dynamically assigned the public address to the private network host.

10. A method of operating a communication network, wherein the communication network includes a domain name server and a network address translator, the method comprising:
    in the domain name server,
        maintaining a first address data structure having a host name field, a private address field, a public address field, and a lease time field, and determining if any public addresses in the public address field of the first address data structure have timed-out and updating the fist address data structure responsive to determining that at least one of the public addresses in the public address field of the first address data structure has tined-out;

receiving a query from a requesting host for a public address of a private network host, determining if a public address for the private network host has been assigned as indicated by the first address data structure, and transmitting a request for the public address of the private network host if the public address of the private network host has not been assigned;

in the network address translator, maintaining a second address data structure having a host name field, a private address field, a public address field, and a lease time field;

receiving the request for the public address of the private network host, dynamically assigning the public address to the private network host and a time period for the assignment of the public address to the private network host, updating the second address data structure based on the public address and time period assignment, and transmitting a response indicating the public address of the private network host and the time period;

determining if any public addresses in the public address field of the second address data structure have timed-out and if at least one of the public addresses in the public address field of the second address data structure has timed-out, then updating the second address data structure and transmitting a message to the domain name server that the public address of the private network host is no longer valid; and in the domain name server, receiving the response indicating the public address of the private network host and the time period, updating the first address data structure based on the public address and time period assignment, and transmitting the public address of the private network host to the requesting host.

11. The method of claim 10 wherein the public address comprises an Internet Protocol (IP) address.

12. The method of claim 10 wherein the time period indicates a time period in which the public address of the private network host is valid.

13. The method of claim 10 wherein the time period specifies a time duration of network inactivity for the public address.

14. The method of claim 10 wherein the request to the network address translator is in a Simple Network Management Protocol format.

15. The method of claim 10 further comprising:
in the domain name server, receiving and processing management messages to update the first address data structure.

16. The method of claim 10 further comprising:
in the network address translator,
determining if a public address has already been assigned to the private network address before dynamically assigning the public address to the private network host; and
transmitting the response indicating the public address already assigned to the private network host.

17. The method of claim 16 further comprising:
in the network address translator, transmitting an indication of a time period remaining for which the public address is valid.

18. The method of claim 10 further comprising:
in the network address translator, determining if a public address is available before dynamically assigning the public address to the private network host.

* * * * *